(No Model.)

C. H. E. KROGMANN.
PHOTOGRAPHIC LENS.

No. 409,981. Patented Aug. 27, 1889.

WITNESSES:
F. McArdle.
E. M. Clark.

INVENTOR:
Chas. H. E. Krogmann
BY Munn & Co.
ATTORNEYS.

UNITED STATES PATENT OFFICE.

CHARLES H. E. KROGMANN, OF CINCINNATI, OHIO.

PHOTOGRAPHIC LENS.

SPECIFICATION forming part of Letters Patent No. 409,981, dated August 27, 1889.

Application filed January 7, 1889. Serial No. 295,696. (No model.)

*To all whom it may concern:*

Be it known that I, CHARLES H. E. KROGMANN, of Cincinnati, in the county of Hamilton and State of Ohio, have invented a new and Improved Photographic Lens, of which the following is a specification, reference being had to the annexed drawings, forming a part thereof, in which—

Figure 1:
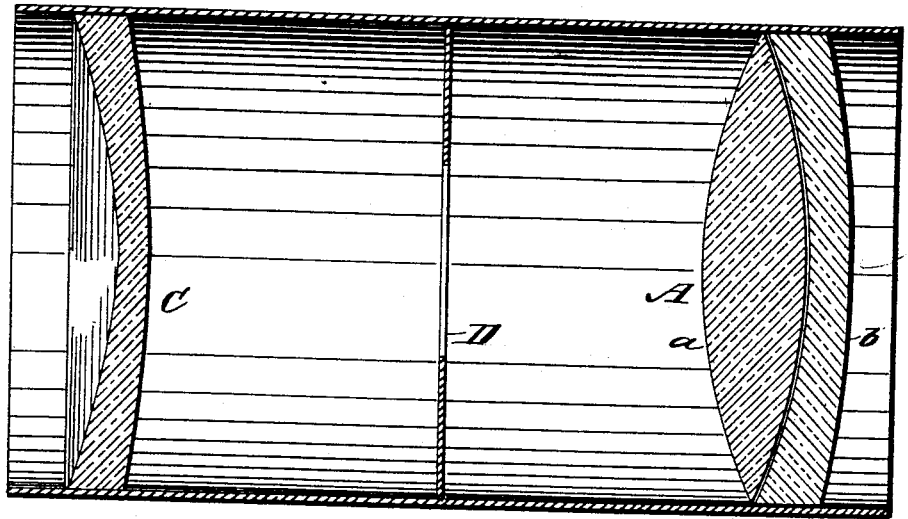
Figure 2:
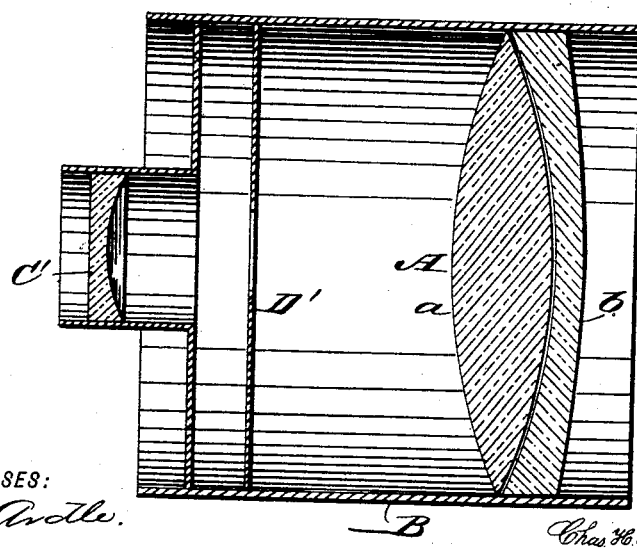

Figure 1 is a longitudinal section of a photographic-lens tube constructed according to my improvement, and Fig. 2 is a modification of the same.

Similar letters of reference indicate corresponding parts in both views.

The object of my invention is to construct a photographic lens in which the intensity of the light will be equal throughout the entire field and in which the sharpness of the image will be uniform, and one which may be used for both portraits and views and which may be adapted for telescopic, microscopic, and other uses where an achromatic objective is required.

The invention consists in the peculiar construction and arrangement of parts, as hereinafter fully described, and pointed out in the claim.

In carrying out my invention I provide an achromatic lens A, formed of a double convex lens $a$ and a meniscus concave lens $b$, of flint-glass, the two lenses being connected together in the usual way. The achromatic lens is arranged in the rear end of the tube B. In the front of the said tube B is placed a single meniscus concave lens C, of crown-glass, and between the lens C and lens A is arranged a diaphragm D, which screens off some of the marginal rays.

In Fig. 2 the construction is substantially the same, except that the front lens C' is a single plano-concave lens of crown-glass, of smaller diameter than the lens C, and the diaphragm D', having a smaller aperture than that of the diaphragm D, is arranged near the front lens C'. This construction enables me to use a shorter tube B.

Having thus described my invention, I claim as new and desire to secure by Letters Patent—

In a lens for photographic and other purposes, the combination of two unequal lenses, the front lens being a single concave lens with negative focus, and the back lens an achromatic lens with positive focus, the two focuses or powers being separated by a diaphragm, substantially as specified.

CHARLES H. E. KROGMANN.

Witnesses:
WM. MULTNER,
WM. M. MCGARY.